No. 775,390. PATENTED NOV. 22, 1904.
S. CABOT.
ELECTRICAL SIGNALING APPARATUS.
APPLICATION FILED MAR. 23, 1904.
NO MODEL. 3 SHEETS—SHEET 1.

Witnesses.
Grace E. Gibbons
Margaret H. Danihes.

Inventor.
Sewall Cabot
By Roberts & Mitchell
Attorneys

No. 775,390. PATENTED NOV. 22, 1904.
S. CABOT.
ELECTRICAL SIGNALING APPARATUS.
APPLICATION FILED MAR. 23, 1904.
NO MODEL. 3 SHEETS—SHEET 2.

Witnesses.
Grace E. Gibbons
Margaret H. Daniher.

Inventor.
Sewall Cabot
By Roberts & Mitchell
Attorneys

No. 775,390. PATENTED NOV. 22, 1904.
S. CABOT.
ELECTRICAL SIGNALING APPARATUS.
APPLICATION FILED MAR. 23, 1904.
NO MODEL. 3 SHEETS—SHEET 3.

Witnesses.
Grace E Gibbons
Margaret H. Danaher

Inventor.
Sewall Cabot
By Roberts & Mitchell
Attorneys.

No. 775,390.                                                                    Patented November 22, 1904.

UNITED STATES PATENT OFFICE.

SEWALL CABOT, OF BROOKLINE, MASSACHUSETTS.

ELECTRICAL SIGNALING APPARATUS.

SPECIFICATION forming part of Letters Patent No. 775,390, dated November 22, 1904.

Application filed March 23, 1904.  Serial No. 199,561.  (No model.)

*To all whom it may concern:*

Be it known that I, SEWALL CABOT, a citizen of the United States, and a resident of Brookline, in the county of Norfolk and State of Massachusetts, have invented new and useful Improvements in Electrical Signaling Apparatus, of which the following is a specification.

My invention relates generally to telegraphy and telegraphic signaling; and it consists, broadly, of an apparatus whereby, among other possible uses, reciprocal conditions in a line between sending and receiving stations may be determined automatically by the operator at either end of the line.

More particularly, my invention resides in telegraphic or electrically-controlled apparatus by which an electric switch or conceivably any movable or changeable mechanical or electromechanical apparatus may be automatically operated by electric impulses.

Further and in a more specific aspect, my invention consists, first, in an electromechanical attachment applicable to a telegraphic repeater of a well-known construction, this apparatus having special utility as a means of automatic communication with and control over automatic electric switch-operating apparatus, and, second, an automatic switch-controlling apparatus adapted to be used in connection with a telegraphic repeater.

The salient features of my invention, hereinafter to be described and claimed, are conceivably susceptible of a number of applications and use in the manifold developments of electric signaling. I show and describe, however, an embodiment of my invention and improvements particularly as applied to and as a modification of a well-known and heretofore quite frequently-used telegraphic repeater, which is called the "Woods button-repeater," and for purposes of elucidation I have shown, in—

Figure 1:
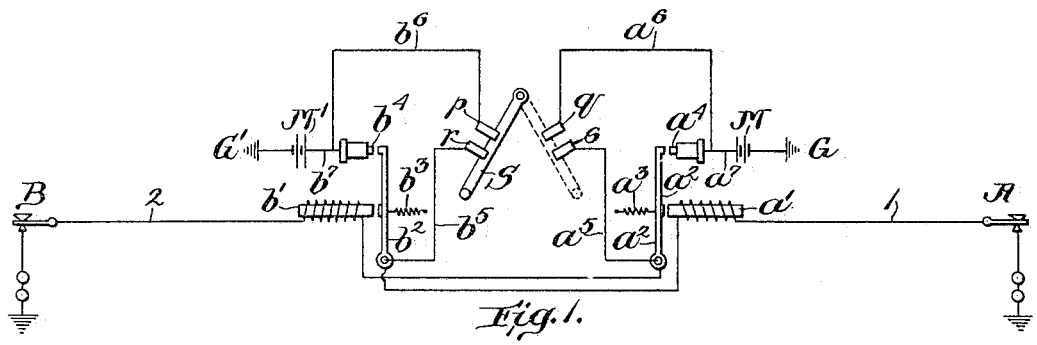
Figure 2:
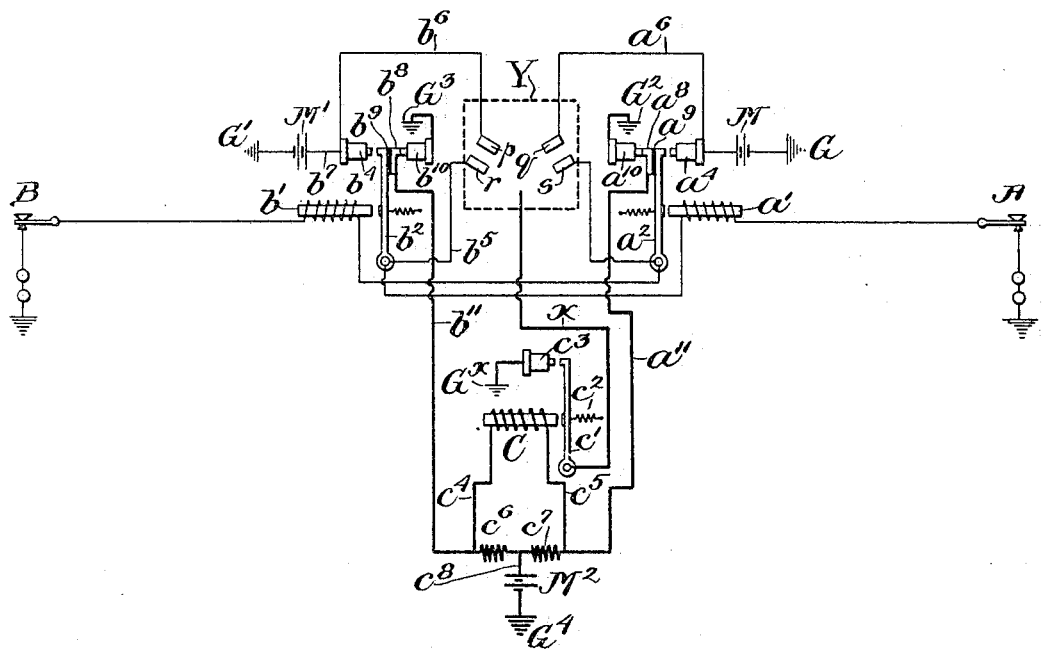
Figure 3:
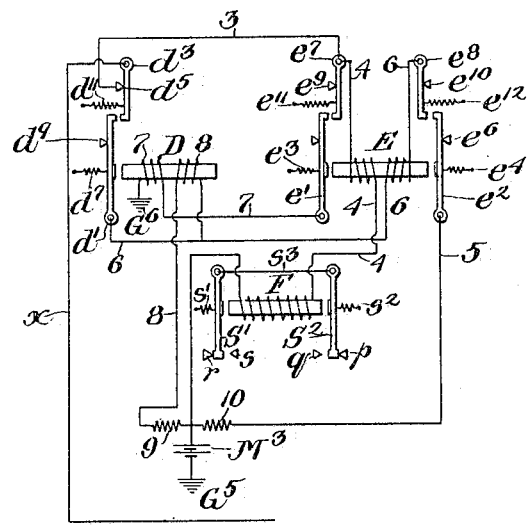
Figure 5:
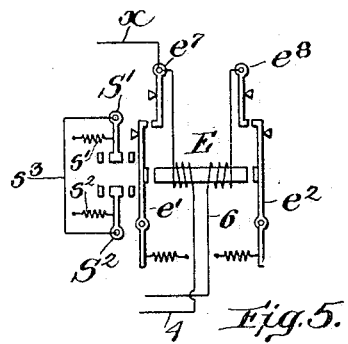

Figure 1, hereto annexed, a diagrammatic representation of this form of repeater reduced electrically to its simplest terms. In Fig. 2 I have shown diagrammatically one step in my modification of or addition to the repeater typically illustrated in Fig. 1. In Fig. 3 I illustrate diagrammatically a form of that feature of my invention which relates to automatic switch-controlling apparatus, and in Fig. 4 I show the automatic switch-controlling apparatus of Fig. 3 applied to the modified repeater arrangement illustrated in Fig. 2. In Fig. 5 I have illustrated in diagram a modification of the apparatus shown in Fig. 3, this modification operating, however, according to the same method and principle as that which characterizes the apparatus shown in Fig. 4.

Referring now to Fig. 1, which shows in diagram a simple form of Wood's button-repeater, A is the key of one station, and B the key of another, each key connected and grounded in an ordinary manner. The line-wire 1 extends from station A to the energizing-coil of the electromagnet $a'$ and thence to the post of the armature $b^2$. The line 2 extends from station B to the energizing-coil of electromagnet $b'$ and thence to the post of the armature $a^2$ of the electromagnet $a'$. Retracting-springs $a^3$ and $b^3$ normally withdraw the armatures $a^2$ and $b^2$ from the electromagnets $a'$ and $b'$. Repeater-contacts $a^4$ and $b^4$ are mounted in such position and adjustment that when electromagnet $a'$ or $b'$ is energized the corresponding armature is drawn into electrical connection with the repeater-contact $a^4$ or $b^4$, as the case may be. From the armatures $a^2$ and $b^2$, respectively, wires $a^5$ and $b^5$ extend to and are connected with switch-contacts $s$ and $r$, respectively, and from the repeater-contacts $a^4$ and $b^4$ wires $a^7$ $b^7$ extend to and are connected with wires $a^6$ $b^6$, which in turn connect with the switch-contacts $q$ and $p$, respectively. Batteries M M', connected with wires $a^7$ and $b^7$ and grounded at G G', respectively, supply the electrical energy for the repeating-station and serve also as the line-batteries. A switch S under the manual control of an attendant serves to connect contacts $p$ $r$ or $q$ $s$, according to the position to which the switch S is moved. If station A be regarded as the sending-station, station B keeps its key closed, and interruptions of key-contact at station A give signals to be repeated from line 1 to line 2, the switch S being in the position shown in full lines in Fig. 1, where contacts $p$ and $r$ are connected there.

by. Assume that while A is sending a message B opens his key as a signal that he wishes to send to A. When A next closes his key, his relay at $a'$ will operate, the circuit being established from ground through A, wire 1, armature $b^2$, wire $b^5$, contacts $r$ and $p$, and switch S, wire $b^6$, wire $b^7$ to battery M', and thence again to ground G'; but relay $b'$ will fail to operate, the circuit at key B being open. The attendant at the repeating-station noting the relay $b'$ fails to operate recognizes this as a signal to change the condition of the line, so that station B may send to station A. This attendant then removes the short circuit from the contact-points $p\ r$, and as these points are now open the operator at A on closing his key finds the circuit open and is made aware of the fact that station B wishes to send to him. He then closes his key to receive signals, and in the meantime the attendant at the repeater-station has placed the short-circuiting switch S in its dotted-line position across the points $q\ s$, so that the operator at station B when he closes his key finds the circuit closed and may proceed to send a message to station A. Both the line-relays $a'\ b'$ again work in unison, and this condition continues until the operator at A desires to send a message to B and opens his key at a time when the key at B is closed. The foregoing is a description of the construction and operation of the old and well-known Woods button-repeater.

Passing now to Fig. 2, I therein show in diagram the first step in the modification of the Woods button-repeater toward that embodiment of my invention which consists in automatic switch-operating contrivances, whereby the services of the attendant at a relay-station may be dispensed with and the operators at stations A and B may control conditions at the repeating-station to suit themselves. At the back of the armatures $a^2$ and $b^2$ I secure back contacts $a^8$ and $b^8$, which are separated from the armatures themselves by insulation $a^9\ b^9$. Fixed contacts $a^{10}$ and $b^{10}$ are connected with ground $G^2\ G^3$, and the armature-pieces $a^8\ b^8$ are connected by wires $a^{11}\ b^{11}$ to the local-circuit wirings of the relay-magnet C and battery $M^2$. The coil of the magnet C is connected with branch wires $c^4\ c^5$, running from wires $b^{11}$ and $a^{11}$, respectively. Resistances $c^6\ c^7$ are connected with wires $b^{11}$ $a^{11}$, respectively, and meet in a connection $c^8$ to the battery $M^2$, which at its other pole is connected to ground $G^4$. If found expedient, these resistances may be relatively adjusted or diversified. The armature $c'$ of relay C is provided with the usual retractile spring $c^2$ and coöperates with a fixed contact-piece $c^3$, which is grounded at $G^\times$, and from the armature $c'$ there extends the wire marked $x$.

So far as the diagram of Fig. 2 goes to show the apparatus associated with the relay C is of no definite specific utility. It is shown in this connection in order to illustrate more clearly its relation to the relay apparatus of the repeating-station. In Fig. 2 also the button-switch arrangements are omitted, and it is for the present left to the imagination to supply an automatic switch-operating device which shall be controlled by the operation of relay C and its attendant mechanism. For the sake of clearness of illustration that portion of the apparatus shown in Fig. 2 which distinguishes it from the apparatus of Fig. 1 is shown in heavy lines. Supposing now that the operator at station A is sending a message to station B and the determining switch or equivalent apparatus connects contacts $p\ r$, thus maintaining the line in condition to send messages from A to B, it has been shown in connection with Fig. 1 that if the operator at station B breaks his circuit while the sending-key at A is closed the synchronism of the relays $a'\ b'$ is interrupted, relay $b'$ failing to act in unison with relay $a'$. With the apparatus illustrated in Fig. 2 when the operator at B breaks his key connection in this manner relay-magnet at $b'$ is deënergized and its retractile spring $b^3$ draws the back contact $b^8$ into closure with the fixed contact $b^{10}$. This grounds the wire $b^{11}$ at $G^3$, and the current flows from battery $M^2$ through both resistances $c^6\ c^7$, wires $c^4$, $c^5$, and $b^{11}$, thus energizing the relay-magnet C, attracting the armature $c'$ into contact with the fixed piece $c^3$, and grounding the wire $x$ at $G^\times$. Only under these conditions or under the reciprocal conditions when B is the sender and A the receiver will the relay-magnet C be actuated to ground the wire $x$, because under any other conditions either no current at all flows over the wires $a^{11}\ b^{11}$ or else there is no difference in potential between the junctions of wire $c^4$ $c^5$ to the circuit of battery $M^2$. Thus only when the sender's key is closed and the receiver opens his key-circuit will the circuit formed by the wire $x$ be closed. In Fig. 2 I have shown a dotted square (marked Y) embracing the button-switch contacts $p\ q\ r\ s$ and have illustrated the wire $x$ as terminating in this dotted square Y. If now it be assumed that the square Y represents an automatic switch-operating mechanism, of which the action shall be directed and determined by the grounding of the wire $x$, it is apparent that the receiver, either A or B, may at his option whenever the circuit is closed determine the conditions at the repeating-station, which shall automatically cause a reversal of position of the circuit-establishing switch, and thus place the receiver at B into position to operate as a sender to A, or vice versa.

In Fig. 3 I show diagrammatically an apparatus which fulfils the automatic conditions heretofore assumed with respect to the dotted square Y of Fig. 2. For the sake of avoiding confusion I have shown in Fig. 3 only the terminus of the wire $x$ and the contact-points $p\ q\ r\ s$ which pertain to the apparatus diagrammatically shown in Fig. 2, the rest of Fig. 3 being devoted solely to the local apparatus which constitutes the automatic switch-operating devices. I provide three electromagnets. Magnet F, which immediately actuates and determines the position of armature and switch-arms $S'\ S^2$, the retractile springs $s'\ s^2$ supplying the source of energy for one movement of the switch, while the coil of the electromagnet F supplies the energy for the reverse movement. The electromagnet E, which I term the "operating-magnet," is provided with two coils which are differentially wound, one of them (connected with wire 4) being in series with the coil of electromagnet F, the other (connected with wire 6) being connected with armature-operated contacts presently to be described. A third electromagnet, D, which I term the "preparatory" magnet, is also provided with two coils or sections of coil; but these are wound so that whether one or both of the coils be energized the magnet D will attract its armature. The coil 7 is grounded at $G^6$, while the coil 8 is connected at one end with wire 6 and at the other with the battery $M^3$. Resistances 9 and 10 provide means for obtaining the necessary balance between magnetic moments of the differential coils of magnet E and otherwise adjusting magnetic moments to their proper value with relation to the battery strength employed. The wiring of this system is as follows: Beginning with the wire $x$, this wire is connected with switch-arm $d^3$, which is drawn by the retractile spring $d^{11}$ against a stop $d^5$. From this stop extends the wire 3, which is connected to the switch-arm $e^7$, the said switch-arm being drawn against the stop $e^9$ by retractile spring $e^{11}$. Connected also with the switch-arm $e^7$ is the wire 4, which forms one section of the differential coiling of the operating-magnet E and extends therefrom to the coil of magnet F and thence to battery $M^3$, which is grounded at $G^5$ at its opposite pole. The armature $e'$ of the magnet E is connected by wire 7 to one of the coils on magnet D and thence to ground $G^6$. The armature $e^2$ of the magnet E is connected by wire 5 and resistance-coil 10 with battery $M^3$. The switch-arm $e^8$ is connected by wire 6 with the second coil of magnet E and thence to the armature $d'$ of magnet D. The wire 8 connects with wire 6 at one terminus and extends thence through the second coil of magnet D and thence to resistance-coil 9 and battery $M^3$. Now suppose that wire $x$ be grounded. This at once closes circuit through $d^3$, wire 3, wire 4, battery $M^3$ to ground $G^5$. Coils of wire 4 around magnets E and F energize those magnets which attract their respective armatures. The armatures $S'\ S^2$ of magnet F are drawn into contact, respectively, with points $q$ and $s$. The closure of the circuit from $x$ through battery $M^3$ to ground at $G^5$ has energized magnet E, and the armatures $e'\ e^2$ are drawn into contact with the switch-arms $e^7\ e^8$. Tracing the circuits through these contacts, it will be seen that the closure from ground $G^6$ through coil and wire 7, armature $e'$, switch-arm $e^7$, wire 4 to battery $M^3$ and ground $G^5$ is established. This closure of circuit-contacts, however, is for the present ineffective to energize magnet D, because the ground of wire $x$ remains unbroken and the resistance from wire $x$ to ground is when compared with the resistance of the coil of wire 7 on magnet D practically nil. Now let the ground be removed from wire $x$. This diverts the current through the circuit already closed by contact from ground $G^6$ through wire 7, armature $e'$, arm $e^7$, wire 4 to battery $M^3$, and the armature $d'$ of magnet D is attracted and comes in contact with and removes the arm $d^3$ from its stop-contact $d^5$. At this stage of the cycle all the magnets D, E, and F are energized and their armatures consequently locked in position. With the apparatus in this condition suppose the wire $x$ to be grounded again. Its connection with wire 3 is broken at the point $d^5$; but a circuit is now closed from wire $x$ through arm $d^3$, armature $d'$, wire 6, through the neutralizing-coil of magnet E, switch-arm $e^8$, armature $e^2$, wire 5 to battery $M^3$ and ground $G^5$. The simultaneous closure of circuit through both coils of the magnet E throws that magnet out of action, the said coils being differentially wound with respect to the force and polarity of their magnetism, and the retractile springs $e^3\ e^4$ assert themselves, and contacts between the armatures $e'\ e^2$ and the switch-arms $e^7\ e^8$ are broken. Magnet E thus at this stage of the cycle performs the function of a releasing-magnet, in that it breaks the circuit of the coil of magnet F, theretofore conserved in its condition of circuit-closure by the contacts operated by magnet E. The coil of the magnet F is thus thrown out of circuit, the closure-conserving circuit being broken between $e'$ and $e^7$ and the original circuit not yet being closed between $d^3$ and $d^5$, as magnet D is still energized and the switch-arm $d^3$ is held from its contact-point $d^5$. The relaxation of energy in the magnet F gives the springs $s'\ s^2$ an opportunity to swing the switch-arms $S'\ S^2$ over against the contacts $p\ r$, respectively. Now suppose the wire $x$ to be once more removed from ground. The circuit from $x$ through $d^3$, $d'$, wire 6 to switch-arm $e^8$ has been previously broken between $e^8$ and armature $e^2$. Likewise the circuit from $x$ through $d^3$, $d'$, wire 6, wire 8 to battery $M^3$, and ground $G^5$ is now broken by the removal of ground from wire $x$. The coil of wire 7 has previously had its circuit opened between armature $e'$ and switch-arm $e^7$, and the magnet D is thus left without energy, and its armature $d'$ is pulled by the spring $d^7$ against the stop $d^9$. Spring $d^{11}$ draws arm $d^3$ against stop $d^5$, and the apparatus is restored to the condition in which we first found it.

Recapitulating, the cycle of operations of the apparatus shown in Fig. 3 (assuming the initial condition of open circuit and inertness of the magnets D, E, and F) is as follows:

(1) Ground wire $x$. This energizes magnets E and F in series, and magnet F throws the switch-arms S' S². By closure of circuit of one of its coils magnet D is ready to act, but remains inactive because of the high resistance of its coil and the relatively low resistance to ground through wire $x$.

(2) Remove the ground from wire $x$. Magnets E and F remain energized, and a coil of magnet D is energized. The movement of the armature of magnet D cuts off the wire $x$ from its previous connection to the operating-coil of magnet E and connects it to the neutralizing-coil of magnet E and holding-coil of magnet D. Magnets E and F are now closed through the coil of magnet D to ground.

(3) Ground wire $x$ again. The second or neutralizing coil of the two differential coils on the magnet E is now in closed circuit, and magnet E ceases to operate. This breaks the connections established through the coil of magnet F, and that ceases to operate. Magnet D remains energized through its own armature connections and holding-coil.

(4) Remove the ground from $x$. This breaks the last connection through the coil of magnet D, which ceases to operate, and its armatures are retracted to their original position.

It is clear, therefore, that whatever condition is determined at the magnet F by a grounding of wire $x$ that condition is preserved irrespective of the removal of ground from wire $x$ until a subsequent successive grounding of $x$.

The foregoing description of cycle of operations demonstrates the following: that magnet D operates one way or the other only when the control-circuit of the control-line (wire $x$) is broken and also that magnet E operates one way or the other only when the control-circuit of the control-line (wire $x$) is closed, and, moreover, that the operation of magnet D, whether it be energized or deënergized, upon the opening of the circuit of wire $x$ is preparatory to and determines the action of magnet E upon a subsequent closing of the circuit $x$. The function of magnet D is therefore preparatory, and at the same time the action of magnet E has a reciprocal effect upon the magnet D, so that the serial or cycle operation of the magnets in this apparatus is predetermined. In its relation to the apparatus as a whole, however, magnet E performs the functions of an operating relay or magnet, in that when by the activity of one of its coils it is energized it serves to close and maintain the circuit necessary to hold the switch-armatures against their retracting-springs and that when by the operation of its differential coils it is deënergized it opens the circuit of the coil of magnet F, thus releasing the hold of the latter upon the button-switch arms S' S². As we shall see presently, the magnet E might itself be used in immediate effect on the switch-arms and separate magnet F be eliminated. The continuance of magnetism in one coil of magnet E is necessary to hold the switch-arms, whether the magnet F be used or E alone. It is when the switch-arms are released that the function of operating-magnet E as a releasing-magnet comes into prominence. In the cycle operation of the apparatus the magnet E at one stage of the cycle performs the function of holding the switch-arms in the specific apparatus shown by preserving the closure of circuit through the coil of magnet F and at this stage is effective to conserve the condition in the magnet F, which was suspended by the previous circuit-closure of the control-line. If this condition is to be preserved in the coil of magnet F, it is obviously advisable to provide circuit-conserving mechanism which shall operate independently of the closure of the control-line circuit, and thus be unaffected while that circuit is open.

Figure 4:
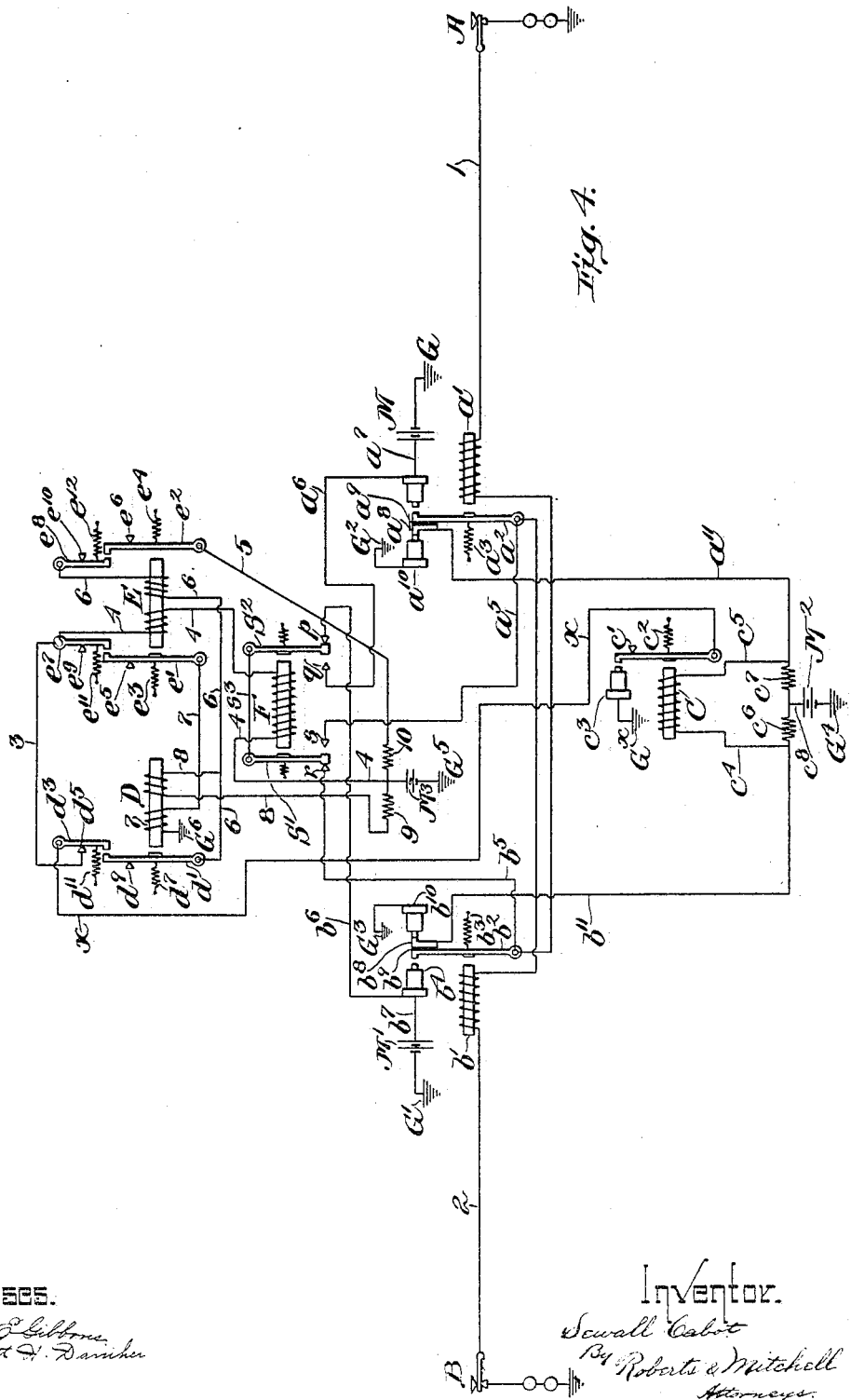

In Fig. 4 I have shown in diagram the entire assembled apparatus heretofore described by instalments in connection with Figs. 1, 2, and 3. The wire $x$ serves as the connection between the automatic switch-operating mechanism and the determining-relay C. Referring back to Fig. 2 and the description relating thereto, it will be remembered that the determining-relay C operates to close the circuit of wire $x$ only when the receiving-station key is opened at a time when the sending-station key is closed, and it will be remembered also in connection with the description of Fig. 1 that when the button-switch is closed between contacts $p$ and $r$ A is a sending-station and B is a receiving-station and that when the said switch closes contacts $q$ and $s$ B is the sending and A the receiving station. In order to enable B to ground the wire $x$, it is essential that the button-switch is in such position that B is a receiving-station. A cannot operate the relay C until the button-switch is reversed and A is the receiving-station.

Referring again to Fig. 2, suppose the switch closes points $p\ r$ and the receiver B while the key A is closed opens his key and operates the relay C, and that then, either by an attendant or by automatic means, the connection between points $p\ r$ is broken and that between $q$ and $s$ is closed. The circuit through the coil of magnet C is thus at once broken, because the circuit from A, through wire 1, armature $b^2$, wire $b^5$, wire $b^6$, to battery M' and ground G' is broken at the points $p\ r$; relay-magnet $a'$ loses its energy, and the armature $a^2$ is drawn against the fixed contact $a^{10}$, and the current is established from G², through contact $a^{10}$, back contact $a^8$, wire $a^{11}$, resistance $c^7$, wire $c^8$, to battery $M^2$ and ground $G^4$ and relay C is short-circuited and ceases to act. Bearing this in mind and turning to Fig. 4, it will be observed that the operation of magnet F upon the grounding of wire $x$ automatically shifts the switch-contact, so that the connection between $p$ and $r$ is broken and that between $q$ and $s$ is established, the armature-switches S' and $S^2$ being connected by wire $s^3$. This reversal of the automatic button-switch instantly throws the magnet C out of action and breaks the ground of wire $x$. By the automatic operation of the switch the complete cycle of this apparatus is as follows, starting with the condition where A is the sending and B is the receiving station, magnet F being inert and the button-switch contacts $p\ r$ being connected.

(1) Receiver B when the key at A is closed open his key. Magnet C is energized, and the circuit of wire $x$ is closed to ground. Magnets E and F are energized in series, and switches S' $S^2$ shift the closure from $p\ r$ to $q\ s$, and a coil of magnet D is connected to contacts $e'\ e^7$, but remains inert by reason of its high resistance relatively to the circuit through wire $x$ to ground.

(2) The shifting of the switch-arms S' $S^2$ automatically opens the circuit of wire $x$. Magnets E and F remain energized. Magnet D is energized. The movement of the armature of magnet D cuts off the direct connection of wire $x$ from the coil of magnet E; but magnets E and F remain energized through the circuit-closure of the wires through the coils of magnet D to ground.

(3) The operator at station A, which is now the receiving-station, interrupts by opening his key while the key at B is closed. This closes the circuit of wire $x$ to ground by the operation of magnet C. The second of the two differential coils on magnet E is closed. Magnet E becomes inert, and the coil of F is cut out. The switch S' $S^2$ is thrown in the reversed direction by the retractile springs $s'\ s^2$, and this operation again automatically removes the ground from $x$.

(4) Upon the automatic opening of the circuit of wire $x$ the current in the coil of magnet D is interrupted and the armature of magnet D responds to the retractile spring $d^7$, and the cycle is complete, the apparatus being left in the condition first supposed, where A is the sending-station and B is the receiving-station.

With respect to the automatic switch-operating mechanism the circuit of the wire $x$ is the control-circuit, and it is clear that whatever condition is determined in the switch-operating magnet by the circuit-closure of the control-line that condition is preserved irrespective of the circuit-opening of the control-line until a subsequent successive circuit-closure of the control-line, and, moreover, whatever condition is determined at the switch-operating magnet by a closure of the control-circuit the resulting operation of the switch-magnet automatically opens the control-circuit.

It will be obvious that a control-line circuit and its determining apparatus substantially like that embodied in the relay-magnet C and its attendant devices may be utilized to actuate or initiate the operation of many conceivable electrical, mechanical, or electromechanical apparatus, and it will also be obvious that the combination of electromechanical devices such as illustrated in Fig. 3 may be employed usefully in situations which differ specifically from the one herein adopted to illustrate the operation and utility of this apparatus.

I have shown in Fig. 5 a modification of the apparatus of Fig. 3. It will have been observed that the action of electromagnets E and F is at all times simultaneous. It is therefore quite feasible to make one magnet do the work of two by using the differentially-wound magnet E with a combination of switches actuated by the armatures which perform the functions of the switches S' $S^2$ on one hand and the circuit closing and opening functions of the armatures $e'$ and $e^2$ on the other. In this form of apparatus the switch-armatures S' $S^2$ are, in common with the armature $e'$, placed within the effective field of force of the magnet E and are, as before, connected by a wire $s^3$. The retracting-springs $s'\ s^2$ or the force of the magnet E is effective to draw the armatures S' $S^2$ in one direction or the other. This condensed arrangement, whereby one of the magnets shown in Fig. 4 is dispensed with, may be substituted for the complete apparatus shown in Fig. 4, but will operate upon exactly the same principle. However, for reasons connected with the possibilities and difficulties of adjustment of relay apparatus I prefer at present the arrangement shown in Fig. 3, where the switch-magnet and the operating-magnet are separate pieces of apparatus. Theoretically the only difference between the apparatus in Fig. 3 and the modification in Fig. 5 is that in that of Fig. 5 the magnet E is made to perform the double function of switch and operating magnets, the functions, however, remaining as distinct as when the apparatus of Fig. 3 is employed.

What I claim is—

1. The combination of a control-line, an operating-electromagnet, a preparatory electromagnet, armatures for the said magnets, closure-contacts, electric connections between the control-line and the coils of the said electromagnets and between the respective coils of the said electromagnets whereof the closure-contacts are reciprocally controlled by the said armatures.

2. The combination with a control-line, an operating-electromagnet having differential coils, a preparatory electromagnet, armatures for the said magnets, closure-contacts, electric connections between the control-line and the coils of the said electromagnets and between the respective coils of the said electromagnets whereof the closure-contacts are reciprocally controlled by the said armatures.

3. The combination of a control-line, an operating-electromagnet having differential coils, a preparatory electromagnet having two magnetically-similar coils, armatures for the said magnets, closure-contacts, electric connections between the control-line and the coils of said electromagnets and between the respective coils of the said electromagnets whereof the closure-contacts are reciprocally controlled by the said armatures.

4. The combination of a control-line, an operating-electromagnet having two differentially-wound coils, a preparatory electromagnet having two similarly-wound coils, armatures for the magnets, closure-contacts, circuit connections as follows: one from the control-line through one coil of the operating-magnet; one from one coil of the operating-magnet through one coil of the preparatory magnet; one from the control-line through the other coil of the operating-magnet; and one from the control-line through the other coil of the preparatory magnet, the closure-contacts of these circuit connections being controlled by the reciprocal action of the magnet-armatures.

5. The combination of a control-line, an operating-electromagnet and a preparatory electromagnet, armatures for the said magnets, electric circuits inclusive of the control-line and coils of said magnets, and closure-contacts therefor controlled by the said armatures to preserve whatever conditions a change in the electrical state (such as circuit-closure) of the control-line determines in the operating-magnet, irrespective of a counterchange in said electrical state, until a subsequent successive resumption of the original determining electrical state by the control-line.

6. The combination of a control-line, an operating-electromagnet having differential coils, a preparatory electromagnet, armatures for the said magnets, electric circuits inclusive of the control-line and the coils of said magnets, and closure-contacts therefor controlled by the said armatures to preserve whatever condition a change in the electrical state (such as circuit-closure) of the control-line determines in the operating-magnet, irrespective of a counterchange in the said electrical state, until a subsequent successive resumption of the original determining electrical state by the control-line.

7. The combination of a control-line, an operating-electromagnet having differential coils, a preparatory electromagnet having two magnetically-similar coils, armatures for the said magnets, electric circuits inclusive of the control-line and said magnet-coils, and closure-contacts therefor controlled by the said armatures, to preserve whatever condition a change in the electrical state (such as circuit-closure) of the control-line determines in the operating-magnet, irrespective of a counterchange in the said electrical state, until a subsequent successive resumption of the original determining electrical state by the control-line.

8. The combination of a control-line, an operating-electromagnet having two differentially-wound coils, a preparatory electromagnet having two similarly-wound coils, armatures for the magnets, electric circuits as follows: one from the control-line through one coil of the operating-magnet; one from one coil of the operating-magnet through one coil of the preparatory magnet; one from the control-line through the other coil of the operating-magnet; and one from the control-line through the other coil of the preparatory magnet; and closure-contacts for the said circuits controlled by the said armatures to preserve whatever condition a change in the electrical state (such as circuit-closures) of the control-line determines in the operating-magnet, irrespective of a counterchange in said electrical state, until a subsequent successive resumption of the original determining electrical state by the control-line.

9. The combination with a telegraphic repeating apparatus of the character described, of an electromagnet, a battery or its equivalent, electric connections between the battery and the movable parts of the repeating apparatus, and closure-contacts controlled by said movable parts and between the battery and the said electromagnet, the latter connections electrically inert when the said movable parts of the repeating apparatus move in unison and electrically active when said unison is interrupted, and means actuated by the operation of the said electromagnet for automatically throwing the determining-switch of the repeating apparatus.

10. The combination with a telegraphic repeating apparatus of the character described, of a relay, electrical connections between the coils thereof to a source of electrical energy and the movable parts of the reciprocally-arranged instruments of the repeating apparatus, said electrical connections constituting the means whereby the said relay is energized when the receiver-key is opened and the sender-key is closed.

11. In combination with a telegraphic repeating apparatus of the character described modified by having its repeater-switch adapted to electromagnetic control, a relay having its coil electrically connected to the movable parts of the reciprocally-arranged instruments of the repeating apparatus and to a source of electrical energy, the said relay magnet-coil electrically inert when the said instruments act in unison and energized when this unison is broken, and a control-line whereof the circuit-closure is determined by the operation of said relay, an operating-electromagnet therefor, a preparatory magnet, armatures for the said magnets, electric circuits inclusive of the control-line and the coils of the said magnets, and closure-contacts therefor controlled reciprocally by the armature of the said magnets.

12. In combination with a telegraphic repeating apparatus of the character described modified by having its repeater-switch adapted to electromagnetic control, a relay having its coil electrically connected to the movable parts of the reciprocally-arranged instruments of the repeating apparatus and to a source of electrical energy the said relay-magnet coil electrically inert when said instruments act in unison and energized when this unison is broken, and a control-line whereof the circuit-closure is determined by the operation of said relay, an operating-electromagnet therefor, a preparatory magnet, armatures for the said magnets, electric circuits inclusive of the control-line and the coils of the said magnets, and closure-contacts therefor controlled by the said armatures to preserve whatever condition a change in the electrical state (such as circuit-closure) of the control-line determines in the switch-operating magnet, irrespective of a counterchange in said electrical state, until a subsequent successive resumption of the original determining electrical state by the control-line.

13. In combination with a telegraphic repeating apparatus of the character described modified by having its repeater-switch adapted to electromagnetic control, a relay having its coil electrically connected to the movable parts of the reciprocally-arranged instruments of the repeating apparatus and to a source of electrical energy, the said relay-coil electrically inert when the said instruments act in unison, and energized when this unison is broken, and a control-line whereof the circuit-closure is determined by the operation of said relay, an operating-electromagnet therefor having two differentially-wound coils, a preparatory electromagnet having two similarly-wound coils, armatures for the said magnets, circuit connections as follows: one from the control-line through one coil of the switch-operating magnet; one from one coil of the switch-operating magnet through one coil of the preparatory magnet; one from the control-line through the other coil of the switch-operating magnet; and one from the control-line through the other coil of the preparatory magnet, the closure-contacts of these circuit connections being controlled by the reciprocal action of the magnet-armatures.

14. In combination with a telegraphic repeating apparatus of the character described modified by having its repeater-switch adapted to electromagnetic control, a relay having its coils electrically connected to the movable parts of the reciprocally-arranged instruments of the repeating apparatus and to a source of electrical energy the said relay-coil electrically inert when the said instruments act in unison, and energized when this unison is broken, and a control-line whereof the circuit-closure is determined by the operation of said relay, an operating-electromagnet therefor having two differentially-wound coils, a preparatory electromagnet having two similarly-wound coils, armatures for the said magnets, circuit connections as follows: one from the control-line through one coil of the switch-operating magnet; one from one coil of the switch-operating magnet through one coil of the preparatory magnet; one from the control-line through the other coil of the switch-operating magnet; and one from the control-line through the other coil of the preparatory magnet; the closure-contacts of these circuit connections being controlled by the reciprocal action of the magnet-armatures to preserve relative conditions a change in the electrical condition (such as circuit-closure) of the control-line determines in the switch-operating magnet irrespective of a counterchange in said electrical state until a subsequent resumption of the original determining electrical state by the control-line.

15. In combination, two lines; two switches, one in each line; two relays one for each line, each adapted to be actuated by its respective line to operate the other line; a switch for controlling said relays to adapt either line to send and the other to receive signals; a pair of opposed circuits, each controlled by one of said relays; a third relay controlled by the pair of opposed circuits; a circuit controlled by the third relay for operating the relay-controlling switch, and means to maintain the third relay inert when under the joint control of said opposed circuits and for causing said relay to operate the circuit of the relay-controlling switch and reverse the conditions of the two lines when either of the opposed circuits is operated to the exclusion of the other.

16. In combination, two lines; two switches, one in each line; two relays, one for each line, each adapted to be actuated by its respective line to operate the other line; a switch for controlling said relays to adapt either line to send and the other to receive signals; a pair of opposed circuits each controlled by one of said relays; a third relay controlled by the pair of opposed circuits; a control-circuit operated by the third relay; means to maintain the third relay inert when under the joint control of said opposed circuits and for causing said relay to operate the control-circuit and reverse the conditions of the two lines when either of the opposed circuits is operated to the exclusion of the other, and means coöperating with said control-circuit for causing alternate operations of said control-circuit to shift the switch in one direction, and the other operations of said control-circuit to shift the switch in the opposite direction.

17. In combination, two lines; two switches, one in each line; two relays, one for each line, each adapted to be actuated by its respective line to operate the other line; a switch for controlling said relays to adapt either line to send and the other to receive signals; a pair of opposed circuits, each controlled by one of said relays; a shunt connecting said opposed circuits; a relay in said shunt; a circuit controlled by the shunt-relay for operating the relay-controlling switch; and resistances in the opposed circuits for causing said shunt-relay to operate the circuit of the relay-controlling switch and reverse the conditions of the two lines when either of the opposed circuits is operated to the exclusion of the other.

18. In combination, two lines; two switches, one in each line; two relays, one for each line, each adapted to be actuated by its respective line to operate the other line; a switch for controlling said relays to adapt either line to send and the other to receive signals; an electromechanical apparatus for operating the relay-controlling switch; a pair of opposed circuits each controlled by one of said line-relays; a third relay controlled by said opposed circuits; a circuit operated by the third relay to control the electromechanical apparatus of the relay-controlling switch, said third relay being inert when under the joint control of said opposed circuits and actuated by the operation of either of said opposed circuits to the exclusion of the other to operate the control-circuit of the electromechanical apparatus and reverse the relay-controlling switch.

Signed by me at Boston, Massachusetts, this 29th day of February, 1904.

SEWALL CABOT.

Witnesses:
ARTHUR F. RANDALL,
JOSEPH T. BRENNAN.